(12) United States Patent
Prince

(10) Patent No.: US 12,508,388 B2
(45) Date of Patent: Dec. 30, 2025

(54) TUBE CONNECTOR FOR VENTILATOR SYSTEM

(71) Applicant: E.T.T Secure LLC, Roy, UT (US)

(72) Inventor: James Prince, Roy, UT (US)

(73) Assignee: E.T.T Secure LLC, Roy, UT (US)

( * ) Notice: Subject to any disclaimer, the term of this patent is extended or adjusted under 35 U.S.C. 154(b) by 969 days.

(21) Appl. No.: 17/688,664

(22) Filed: Mar. 7, 2022

(65) Prior Publication Data
US 2022/0282815 A1  Sep. 8, 2022

Related U.S. Application Data

(60) Provisional application No. 63/157,423, filed on Mar. 5, 2021.

(51) Int. Cl.
*A61M 16/08* (2006.01)
*A61M 16/04* (2006.01)

(52) U.S. Cl.
CPC ........ *A61M 16/0816* (2013.01); *A61M 16/04* (2013.01); *A61M 16/0463* (2013.01)

(58) Field of Classification Search
CPC .............. A61M 16/04; A61M 16/0816; A61M 16/0875; A61M 16/0833; A61M 16/0883; A61M 16/0497; A61M 16/0463; F16L 33/10
See application file for complete search history.

(56) References Cited

U.S. PATENT DOCUMENTS

| | | | | |
|---|---|---|---|---|
| 5,390,669 A * | 2/1995 | Stuart | .................... | A61M 16/08 128/207.14 |
| 5,975,080 A * | 11/1999 | Delaplane | ......... | A61M 16/0497 128/207.15 |
| 10,518,052 B1 * | 12/2019 | Hood | ................ | A61M 16/0493 |
| 2010/0212668 A1 * | 8/2010 | Flanagan | .......... | A61M 16/0833 128/203.16 |
| 2014/0174445 A1 * | 6/2014 | Lindner | ............. | A61M 16/204 128/205.24 |
| 2015/0258297 A1 * | 9/2015 | Blom | ................ | A61M 16/0427 128/200.26 |
| 2018/0078728 A1 * | 3/2018 | Holyoake | ........... | A61M 16/109 |
| 2018/0133429 A1 * | 5/2018 | Reddy | ................ | A61M 16/024 |
| 2019/0290876 A1 * | 9/2019 | Fuller | ............... | A61M 16/0434 |

FOREIGN PATENT DOCUMENTS

WO  WO-2009003175 A1 * 12/2008  ........ A61M 16/0427

* cited by examiner

*Primary Examiner* — Brandy S Lee
*Assistant Examiner* — Rohan Patel
(74) *Attorney, Agent, or Firm* — Kunzler Bean & Adamson

(57) ABSTRACT

A tube connector includes a base, a circuit engagement portion, an ETT engagement portion, a first engagement arm, and a second engagement arm. The circuit engagement portion extends from the base in an inflow direction The ETT engagement portion extends from the base in an outflow direction. The first engagement arm extends from the base in the outflow direction, is located on a first side of the ETT engagement portion, and is spaced apart from the ETT engagement portion such that a first gap is defined between the first engagement arm and the ETT engagement portion. The second engagement arm extends from the base in the outflow direction, is located on a second side of the ETT engagement portion, and is spaced apart from the ETT engagement portion such that a second gap is defined between the second engagement arm and the ETT engagement portion.

19 Claims, 8 Drawing Sheets

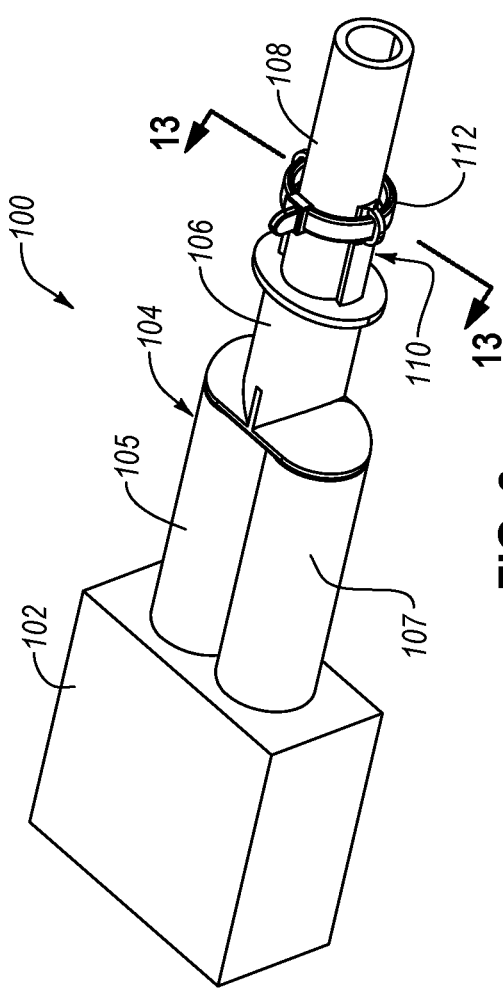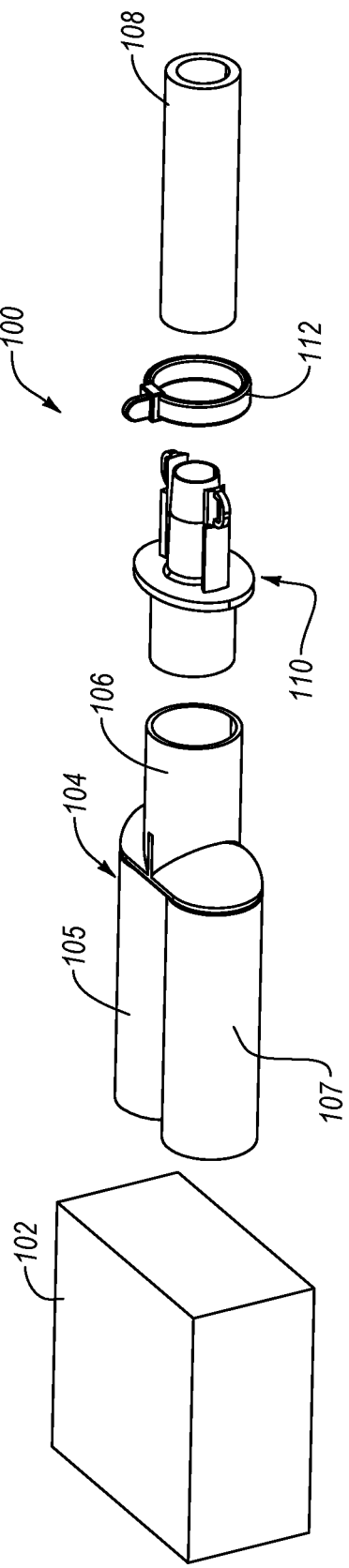
FIG. 2
FIG. 3

TUBE CONNECTOR FOR VENTILATOR SYSTEM

CROSS-REFERENCE TO RELATED APPLICATION

This application claims the benefit of U.S. Provisional Patent Application No. 63/157,423, filed Mar. 5, 2021, which is incorporated herein by reference in its entirety.

FIELD

This disclosure relates generally to ventilator systems, and more particularly to a tube connector that promotes mechanical and fluidic coupling between components of ventilator systems.

BACKGROUND

Ventilator systems include an endotracheal tube (ETT) that provides the interface between a patient and a ventilator. A new or cleaned ETT is connected to the ventilator system prior to use by a patient. During use of the ventilator for delivering fresh air to and receiving used air from a patient, via the ETT, it can be difficult to keep the ETT connected to the ventilator system.

SUMMARY

The subject matter of the present application has been developed in response to the present state of the art, and in particular, in response to the problems and needs of conventional ventilator systems, and corresponding tube connectors, that have not yet been fully solved. In view of the foregoing, the subject matter of the present application has been developed to provide a ventilator system, and a corresponding tube connector, that overcomes many of the shortcomings of the prior art.

The following is a non-exhaustive list of examples, which may or may not be claimed, of the subject matter, disclosed herein.

The following portion of this paragraph delineates example 1 of the subject matter, disclosed herein. According to example 1, a tube connector, for mechanically and fluidically coupling together a flow circuit and an endotracheal tube (ETT) of a ventilator system, comprises a base, a circuit engagement portion, an ETT engagement portion, a first engagement arm, and a second engagement arm. The circuit engagement portion extends from the base in an inflow direction The ETT engagement portion extends from the base in an outflow direction that is opposite the inflow direction. The first engagement arm extends from the base in the outflow direction, is located on a first side of the ETT engagement portion, and is spaced apart from the ETT engagement portion such that a first gap is defined between the first engagement arm and the ETT engagement portion. The second engagement arm extends from the base in the outflow direction, is located on a second side of the ETT engagement portion, which is opposite the first side of the ETT engagement portion, and is spaced apart from the ETT engagement portion such that a second gap is defined between the second engagement arm and the ETT engagement portion.

The following portion of this paragraph delineates example 2 of the subject matter, disclosed herein. According to example 2, which encompasses example 1, above, the tube connector further comprises a tightening strap that is engageable with the first engagement arm and the second engagement arm. When engaged with the first engagement arm and the second engagement arm, the tightening strap is tightenable to urge the first engagement arm and the second engagement arm toward the ETT engagement portion such that the first gap and the second gap are narrowed.

The following portion of this paragraph delineates example 3 of the subject matter, disclosed herein. According to example 3, which encompasses example 2, above, the first engagement arm comprises a first loop, the second engagement arm comprises a second loop, and each one of the first loop and the second loop is configured to receive and retain the tightening strap.

The following portion of this paragraph delineates example 4 of the subject matter, disclosed herein. According to example 4, which encompasses example 2 or 3, above, the tightening strap comprises an elongated strip that comprises a free end and a self-locking mechanism that is configured to receive the free end, to enable the free end to pass through the self-locking mechanism in a first direction, and to prevent the free end from passing through the self-locking mechanism in a second direction that is opposite the first direction.

The following portion of this paragraph delineates example 5 of the subject matter, disclosed herein. According to example 5, which encompasses any one of examples 1-4, above, the first engagement arm comprises a first tube engagement surface that faces the ETT engagement portion and has a first radius of curvature about a first axis that is parallel to or coaxial with the inflow direction. The second engagement arm comprises a second tube engagement surface that faces the ETT engagement portion and has a second radius of curvature about a second axis that is parallel to or coaxial with the inflow direction and that is equal to the first radius of curvature.

The following portion of this paragraph delineates example 6 of the subject matter, disclosed herein. According to example 6, which encompasses example 5, above, each one of the first tube engagement surface and the second tube engagement surface comprises friction-inducing features.

The following portion of this paragraph delineates example 7 of the subject matter, disclosed herein. According to example 7, which encompasses any one of examples 5 or 6, above, the first tube engagement surface, the second tube engagement surface, and the ETT engagement portion are concentric.

The following portion of this paragraph delineates example 8 of the subject matter, disclosed herein. According to example 8, which encompasses any one of examples 1-7, above, each one of the first engagement arm and the second engagement arm is a cantilevered structure with a supported end at the base and an unsupported end away from the base. The unsupported end of each one of the first engagement arm and the second engagement arm is movable, toward and away from the ETT engagement portion, relative to the supported end of the corresponding one of the first engagement arm and the second engagement arm.

The following portion of this paragraph delineates example 9 of the subject matter, disclosed herein. According to example 9, which encompasses example 8, above, the first engagement arm comprises a first loop located at the unsupported end of the first engagement arm and the second engagement arm comprises a second loop located at the unsupported end of the second engagement arm.

The following portion of this paragraph delineates example 10 of the subject matter, disclosed herein. According to example 10, which encompasses any one of examples 1-9, above, the ETT engagement portion comprises a hollow cylindrical structure and at least a portion of an outer surface of the hollow cylindrical structure is tapered in the outflow direction.

The following portion of this paragraph delineates example 11 of the subject matter, disclosed herein. According to example 11, which encompasses any one of examples 1-10, above, the base, the circuit engagement portion, the ETT engagement portion, the first engagement arm, and the second engagement arm form a one-piece, seamless, and monolithic construction.

The following portion of this paragraph delineates example 12 of the subject matter, disclosed herein. According to example 12, which encompasses any one of examples 1-11, above, each one of the circuit engagement portion and the ETT engagement portion comprises a hollow cylindrical structure. The base comprises a flat, plate-like structure. The tube connector further comprises an interior channel that passes entirely through the circuit engagement portion, the base, and the ETT engagement portion.

The following portion of this paragraph delineates example 13 of the subject matter, disclosed herein. According to example 13, which encompasses example 12, above, a diameter of a portion of the interior channel defined by the ETT engagement portion is less than a diameter of a portion of the interior channel defined by the circuit engagement portion.

The following portion of this paragraph delineates example 14 of the subject matter, disclosed herein. According to example 14, which encompasses any one of examples 1-13, above, a maximum dimension of the base, on a plane perpendicular to the inflow direction, is greater than a maximum distance, along the plane, between an outer peripheral extent of the first engagement arm and an outer peripheral extent of the second engagement arm.

The following portion of this paragraph delineates example 15 of the subject matter, disclosed herein. According to example 15, which encompasses any one of examples 1-14, above, the tube connector further comprises a third engagement arm, extending from the base in the inflow direction, located on a first side of the circuit engagement portion, and spaced apart from the circuit engagement portion, such that a third gap is defined between the third engagement arm and the circuit engagement portion. The tube connector additionally comprises a fourth engagement arm, extending from the base in the inflow direction, located on a second side of the circuit engagement portion that is opposite the first side of the circuit engagement portion, and spaced apart from the circuit engagement portion, such that a fourth gap is defined between the fourth engagement arm and the circuit engagement portion.

The following portion of this paragraph delineates example 16 of the subject matter, disclosed herein. According to example 16, which encompasses any one of examples 1-15, above, each one of the first engagement arm and the second engagement arm surrounds no more than 15% of a circumference of the ETT engagement portion.

The following portion of this paragraph delineates example 17 of the subject matter, disclosed herein. According to example 17, a ventilator system comprises a ventilator that is operable to alternately generate an oxygen-rich air flow and receive an oxygen-depleted air flow. The ventilator system also comprises a flow circuit that is fluidically coupled with the ventilator to receive the oxygen-rich air flow from the ventilator and to provide the oxygen-depleted air flow to the ventilator. The ventilator system further comprises a tube connector that is fluidically coupled with the flow circuit to receive the oxygen-rich air flow from the flow circuit and to provide the oxygen-depleted air flow to the flow circuit. The ventilator system additionally comprises an endotracheal tube (ETT) that is fluidically coupled with the tube connector to receive the oxygen-rich air flow from the tube connector and to provide the oxygen-depleted air flow to the tube connector. The tube connector comprises a circuit engagement portion, mechanically engaged with the flow circuit, and an ETT engagement portion, mechanically engaged with the ETT. The tube connector additionally comprises a first engagement arm and a second engagement arm spaced apart from the ETT engagement portion, on opposite sides of the ETT engagement portion, such that respective gaps are defined between the first engagement arm and the ETT engagement portion, and between the second engagement arm and the ETT engagement portion, wherein the ETT is positioned within the gaps. The tube connector also comprises a tightening strap that is engaged with the first engagement arm and second engagement arms to urge the first engagement arm and the second engagement arm against the ETT such that the ETT is clamped between the first engagement arm and the ETT engagement portion and between the second engagement arm and the ETT engagement portion.

The following portion of this paragraph delineates example 18 of the subject matter, disclosed herein. According to example 18, which encompasses example 17, above, the first engagement arm comprises a first tube engagement surface, facing the ETT engagement portion and having a first radius of curvature, the second engagement arm comprises a second tube engagement surface, facing the ETT engagement portion and having a second radius of curvature, and the first radius of curvature and the second radius of curvature are equal to a radius of curvature of an exterior surface of the ETT.

The following portion of this paragraph delineates example 19 of the subject matter, disclosed herein. According to example 19, which encompasses example 17 or 18, above, a size of the gaps, along at least a portion of the gaps, is greater than a thickness of the ETT when the tightening strap is not engaged with the first engagement arm and the second engagement arm. The size of the gaps, along at least a portion of the gaps, is equal to the thickness of the ETT when the tightening strap is engaged with the first engagement arm and the second engagement arm.

The following portion of this paragraph delineates example 20 of the subject matter, disclosed herein. According to example 20, a method of assembling a ventilator system comprises mechanically and fluidically coupling a flow circuit with a circuit engagement portion of a tube connector. The method also comprises mechanically and fluidically coupling an endotracheal tube (ETT) with an ETT engagement portion of the tube connector such that the ETT is positioned between the ETT engagement portion and a pair of engagement arms of the tube connector. The pair of engagement arms are spaced apart from the ETT engagement portion on opposite sides of the ETT engagement portion. The method additionally comprises flexing the pair of engagement arms against ETT such that the ETT is clamped between the pair of engagement arms and the ETT engagement portion.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which:

FIG. 2 is a schematic, perspective view of the ventilator system of FIG. 1, according to one or more examples of the present disclosure;

FIG. 3 is a schematic, exploded, perspective view of the ventilator system of FIG. 1, according to one or more examples of the present disclosure;

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
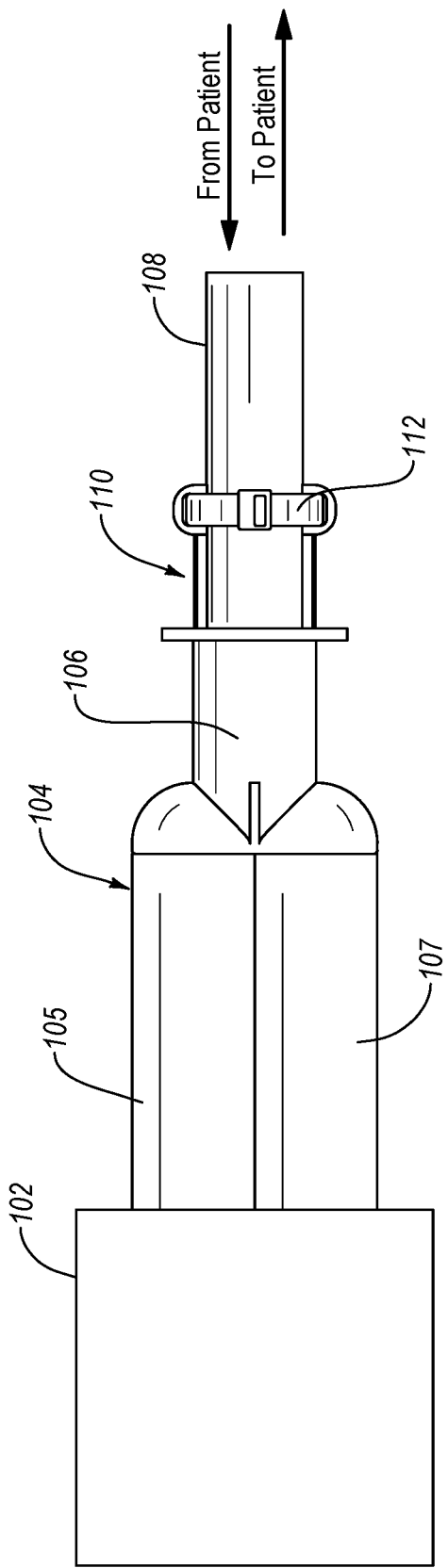
FIG. 1 is a schematic, top plan view of a ventilator system, according to one or more examples of the present disclosure.

Referring to FIGS. 1-3, according to some examples, a ventilator system 100 includes a ventilator 102, a flow circuit 104, an endotracheal tube (ETT) 108, and a tube connector 110. The ventilator 102 is any of various conventional ventilators that are configured to produce an oxygen-rich air flow (e.g., fresh air), for delivery to a patient, and receive an oxygen-depleted air flow (e.g., used air), from the patient. The flow circuit 104 is fluidically coupled with the ventilator 102 to receive the oxygen-rich air flow from the ventilator 102 and to deliver the oxygen-depleted air flow from the patient to the ventilator 102. In some examples, the flow circuit 104 includes an output tube 105, an input tube 107, and a convergence tube 106. The output tube 105 and the input tube 107 converge at and are fluidically coupled with the convergence tube 106. Accordingly, during an outflow operation of the ventilator, the oxygen-rich air flow flows from the ventilator 102, through the output tube 105, and through the convergence tube 106. Conversely, during an inflow operation of the ventilator, the oxygen-depleted air flow flows from the convergence tube 106 into the input tube 107. In other words, both the oxygen-rich air flow and the oxygen-depleted air flow pass through the convergence tube 106, albeit in different directions and at different times.

The tube connector 110 mechanically and fluidically couples together the convergence tube 106 of the flow circuit 104 and the ETT 108. Accordingly, the oxygen-rich air flow from the ventilator 102 flows from the convergence tube 106, through the tube connector 110, and into the ETT 108. Conversely, the oxygen-depleted air flow from the patient flows from the ETT 108, through the tube connector 110, and into the convergence tube 106. Although not shown, the ETT 108 is inserted into the mouth of the patient.

During use of the ventilator 102 for delivering fresh air to and receiving used air from a patient, the ETT 108 tends to become warm, which causes the material of the ETT 108 to soften and condensation to build up in the ETT 108. The tube connectors of conventional ventilator systems are ill-equipped to handle these side effects. For example, the combination of softening of and condensation buildup in the ETT can cause conventional tube connectors to become disengaged with (e.g., slip out of) the ETT. Such disengagement between the tube connector and the ETT creates a potentially dangerous disconnection between the ETT and the flow circuit. Disconnection between the ETT and the flow circuit can result in exposure of healthcare workers to potentially hazardous aerosolized droplet material from the patient, a collapse of a patient's lungs, a drop in the patient's oxygen levels, and/or the spread of infection to nearby surfaces. Moreover, after a tube connector has become disengaged with an ETT, the entire ETT must be replaced with a new ETT, which introduces additional health risks to the patient and increased costs.

The tube connector 110 of the ventilator system 100 of the present disclosure helps to maintain engagement between the tube connector 110 and the ETT 108 during use of the ventilator system 100, such as after the ETT 108 softens and condensation accumulates in the ETT 108. Accordingly, the tube connector 110 promotes avoidance of the above-presented potential negative consequences associated with the tube connector and the ETT becoming disengaged during use.

Figure 5:
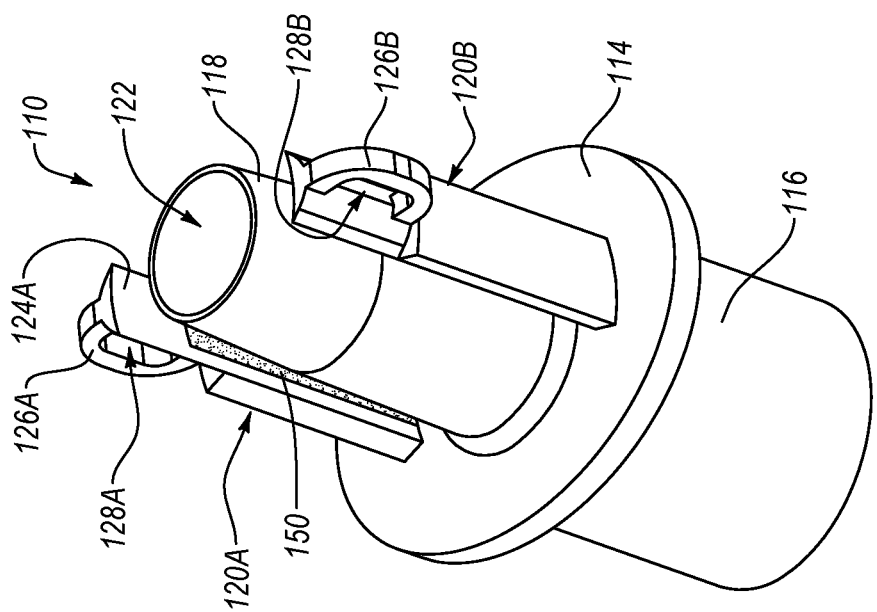
FIG. 5 is a schematic, perspective view of a tube connector of the ventilator system of FIG. 1, according to one or more examples of the present disclosure.
Figure 4:
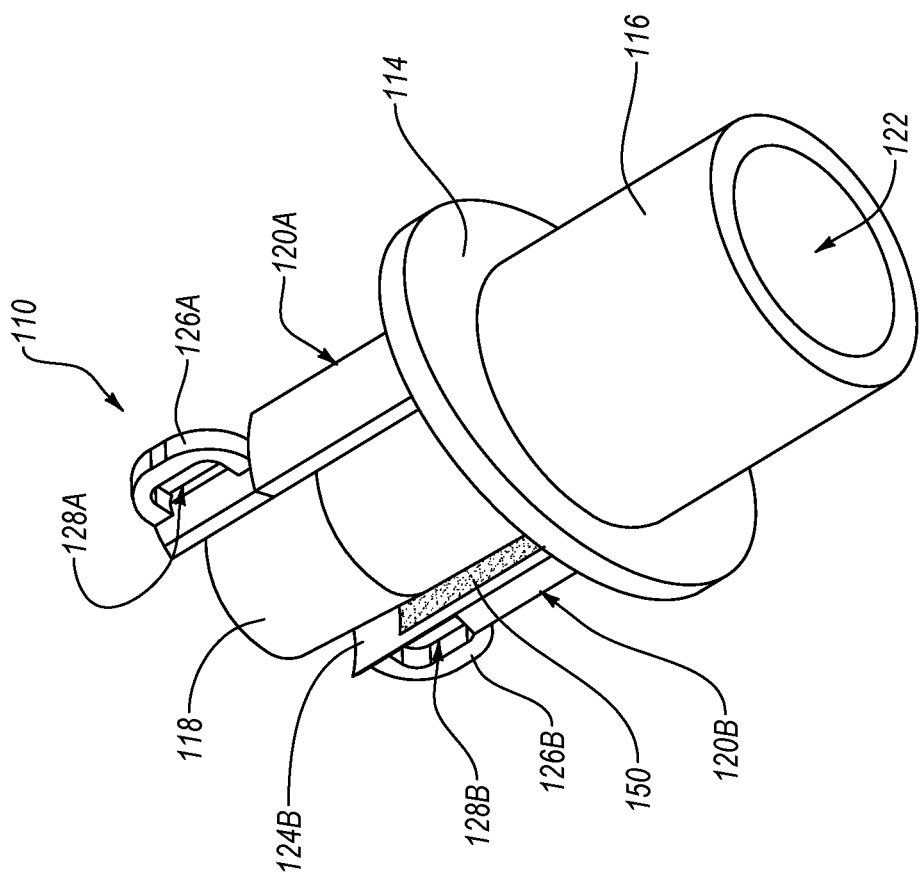
FIG. 4 is a schematic, perspective view of a tube connector of the ventilator system of FIG. 1, according to one or more examples of the present disclosure.

Referring to FIGS. 4 and 5, according to some examples, the tube connector 110 includes a base 114, a circuit engagement portion 116, and an ETT engagement portion 118. Each one of the circuit engagement portion 116 and the ETT tube engagement portion 118 is a hollow cylindrical structure (e.g., tube or conduit), in some examples. Moreover, in certain examples, the base 114 is a flat, plate-like structure. The circuit engagement portion 116 extends from the base 114 in an inflow direction 140 and the ETT engagement portion 118 extends from the base 114 in an outflow direction 142 (see, e.g., FIG. 13). The inflow direction 140, which is the same direction as the oxygen-rich air flow through the tube connector 110, is opposite the outflow direction 142, which is the same direction as the oxygen-depleted air flow through the tube connector 110. The tube connector 110 also includes an interior channel 122 that passes entirely through the circuit engagement portion 116, the base 114, and the ETT engagement portion 118. The interior channel 122 is a through-channel that passes entirely through the tube connector 110. Air passing between the ventilator 102 and the patient flows through the tube connector 110 via the interior channel 122. The circuit engagement portion 116 defines a section of the interior channel 122 and the ETT engagement portion 118 defines another section of the interior channel 122. The interior channel 122 may be wider along the section defined by the circuit engagement portion 116 than along the section defined by the ETT engagement portion 118. Alternatively, the width (e.g., diameter) of the interior channel 122 may be the same along the section defined by the circuit engagement portion 116 and the section defined by the ETT engagement portion 118.

The tube connector 110 also includes a first engagement arm 120A and a second engagement arm 120B extending from the base 114 in the outflow direction and located on opposite sides of the ETT engagement portion 118. Accordingly, the ETT engagement portion 118 is interposed between the first engagement arm 120A and the second engagement arm 120B. The first engagement arm 120A and the second engagement arm 120B are spaced apart from the ETT engagement portion 118, such that a first gap 119A and a second gap 119B are defined between, and run entirely along, the first engagement arm 120A and the second engagement arm 120B, respectively, and the ETT engagement portion 118 (see, e.g., FIGS. 6, 8, and 10). Additionally, the first engagement arm 120A and the second engagement arm 120B include a first tube engagement surface 124A and a second tube engagement surface 124B, respectively, that face the ETT engagement portion 118. In some examples, first tube engagement surface 124A and the second tube engagement surface 124B are concave (e.g., curve about an axis that is parallel to or coaxial with the inflow direction 140 or the outflow direction 142). Also, in certain examples, the first tube engagement surface 124A and the second tube engagement surface 124B are concentric with an outer surface (or exterior surface) of the ETT engagement portion 118. A radius of curvature of the first tube engagement surface 124A and the second tube engagement surface 124B corresponds with (e.g., is substantially equal to) a radius of curvature of the outer surface (or exterior surface) of the ETT 108, in certain examples (see, e.g., FIG. 11).

Each one of the first engagement arm 120A and the second engagement arm 120B surrounds a percentage of a total circumference of the ETT engagement portion 118. Generally, the percentage is relatively small to ensure the first engagement arm 120A and the second engagement arm 120B are flexible (e.g., movable) relative to the ETT engagement portion 118. However, the percentage is large enough to promote retention of the ETT 108 against the ETT engagement portion 118. In some examples, each one of the first engagement arm 120A and the second engagement arm 120B surrounds between 5% and 20%, between 10% and 15%, or no more than 15% of a total circumference of the ETT engagement portion 118.

The first engagement arm 120A and the second engagement arm 120B of the tube connector 110 further include a first loop 126A and a second loop 126B, respectively. The first loop 126A is on an opposite side of the first engagement arm 120A as the first tube engagement surface 124A. Likewise, the second loop 126B is on an opposite side of the second engagement arm 120A as the second tube engagement surface 124B. The first loop 126A defines a first loophole 128A and the second loop 126B defines a second loophole 128B. Accordingly, the first loop 126A and the second loop 126B can have any of various configurations capable of defining respective loopholes.

Figure 6:
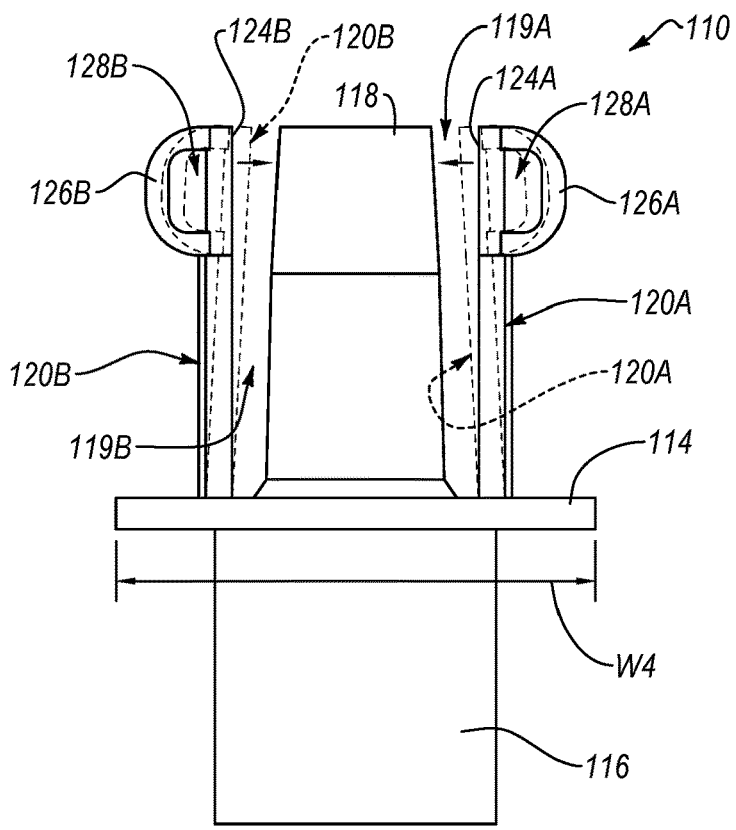
FIG. 6 is a schematic, front elevation view of a tube connector of the ventilator system of FIG. 1, according to one or more examples of the present disclosure.

Referring to FIG. 6, each one of the first engagement arm 120A and the second engagement arm 120B is cantilevered. More specifically, proximal ends of the first engagement arm 120A and the second engagement arm 120B are fixed to, or supported at, the base 114 and distal ends of the first engagement arm 120A and the second engagement arm 120B are free or unattached or unsupported. Moreover, the first engagement arm 120A and the second engagement arm 120B are made of a flexible material (e.g., plastic). The cantilevered nature and flexible material of the first engagement arm 120A and the second engagement arm 120B enable the first engagement arm 120A and the second engagement arm 120B to flex inwardly toward the ETT engagement portion 118, as indicated by directional arrows and dashed lines in FIG. 6, when acted upon by an inwardly directed force. The inward flexing of the first engagement arm 120A and the second engagement arm 120B toward the ETT engagement portion 118 effectively narrows the first gap 119A and the second gap 119B, respectively. At least a portion of the first gap 119A and the second gap 119B has a gap size (e.g., distance between the arms and the outer surface of the ETT engagement portion 118) that is larger than a thickness of the ETT 108 before the arms are inwardly flexed. After the arms are inwardly flexed, the size of the gaps along at least a portion of the gaps is equal to or slightly smaller than the thickness of the ETT 108.

Figure 7:
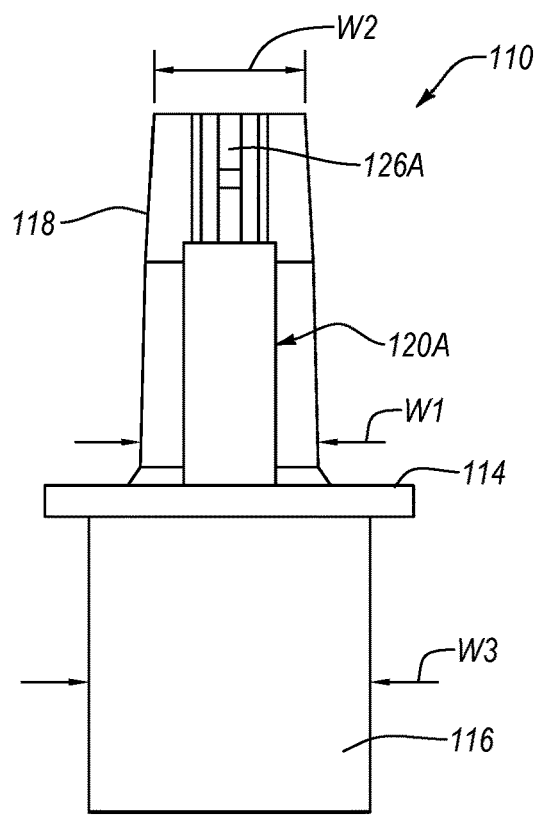
FIG. 7 is a schematic, side elevation view of a tube connector of the ventilator system of FIG. 1, according to one or more examples of the present disclosure.

Referring to FIGS. 6 and 7, the outer surface of the ETT engagement portion 118 is tapered in the outflow direction, in some examples. For example, the outer surface of the ETT engagement portion 118 can have a first width W1 (e.g., first diameter) and a second width W2 (e.g., second diameter), where the first width W1 is closer to the base 114 and greater than the second width W2. The taper of the outer surface of the ETT engagement portion 118 is constant or continuous along an entire length (e.g., an entire central axis) of the ETT engagement portion 118, in certain examples. Alternatively, in other examples, the outer surface of just a tip portion of the ETT engagement portion 118, distally away from the base 114, is tapered. The tapering of the ETT engagement portion 118 promotes initial engagement with (i.e., insertion of the ETT engagement portion 118 into) and self-alignment of an interior channel of the ETT tube 108. In certain examples, the first width W1 is equal to or greater than the diameter of the interior channel of the ETT tube 108, to promote a friction fit between the ETT engagement portion 118 and the ETT tube 108, and the second width W2 is less than the diameter of the interior channel of the ETT tube 108, to promote self-alignment between the ETT engagement portion 118 and the ETT tube 108.

An outer surface of the circuit engagement portion 116 also has a width W3 (e.g., diameter), which corresponds with the diameter of the interior channel of the convergence tube 106. For example, the width W3 of the outer surface of the circuit engagement portion 116 can be equal to the diameter of the interior channel of the convergence tube 106, to promote a friction fit between the circuit engagement portion 116 and the convergence tube 106. In some examples, like the ETT engagement portion 118, the circuit engagement portion 116 is tapered at its tip to help facilitate initial engagement with (i.e., insertion of the circuit engagement portion 116 into) and self-alignment of the interior channel of the convergence tube 106.

An outer periphery of the base 114 has a width W4 (e.g., diameter), which is greater than the width W3 of the outer surface of the circuit engagement portion 116. Additionally, the width W4 of the outer periphery of the base 114 can be greater than the first width W1 and the second width W2, and greater than a maximum distance between the first engagement arm 120A and the second engagement arm 120B (e.g., a maximum distance from an outer peripheral extent of the first engagement arm 120A to an outer peripheral extent of the second engagement arm 120B). In other words, the base 114 can be shaped to extend outwardly, in a direction perpendicular to the outflow and inflow directions, beyond any other portion of the tube connector 110. Because of this, the base 114 can be used as a handle for handling the tube connector 110 during assembly of or disassembly of the ventilator system 100 without contaminating surfaces of the tube connector 110 that will be in contact with air flowing through the ventilator system 100.

Figure 10:
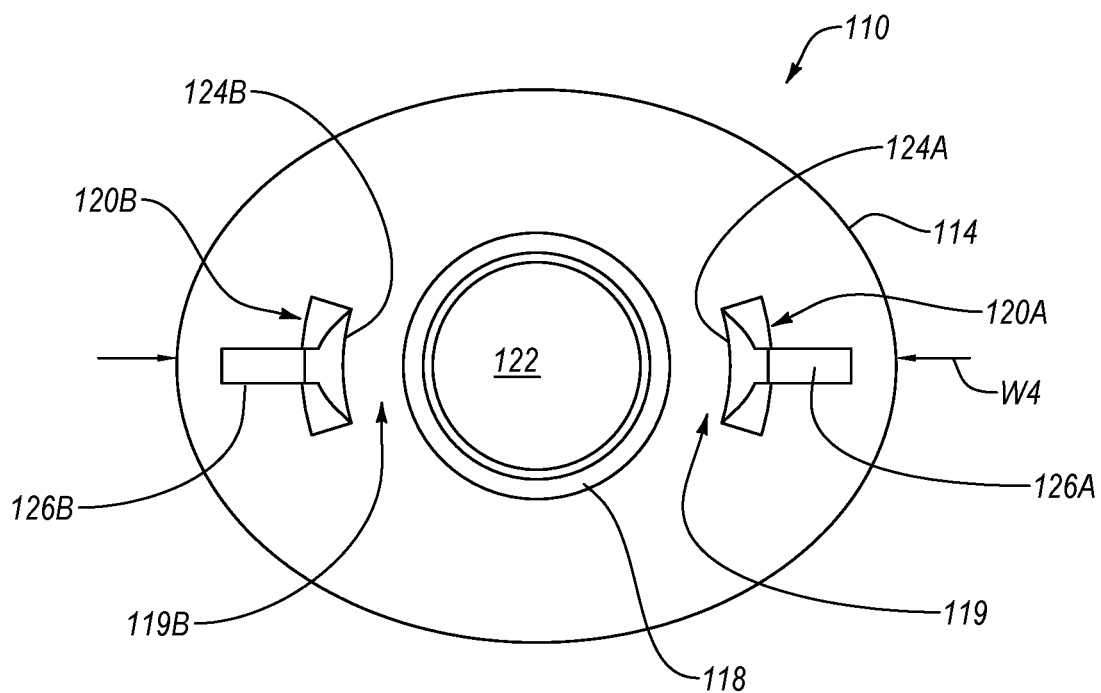
FIG. 10 is a schematic, end view of a tube connector of the ventilator system of FIG. 1, according to one or more examples of the present disclosure.
Figure 11:
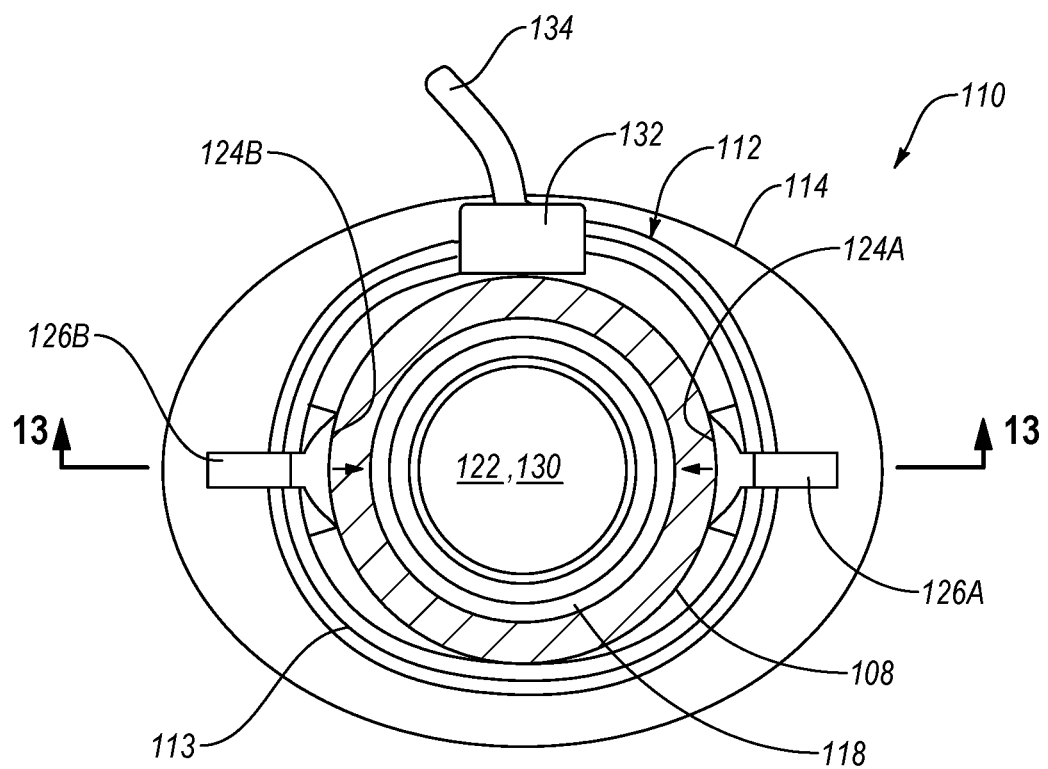
FIG. 11 is a schematic, end view of a tube connector of the ventilator system of FIG. 1, shown partially engaged with an endotracheal tube of the ventilator, according to one or more examples of the present disclosure.
Figure 12:
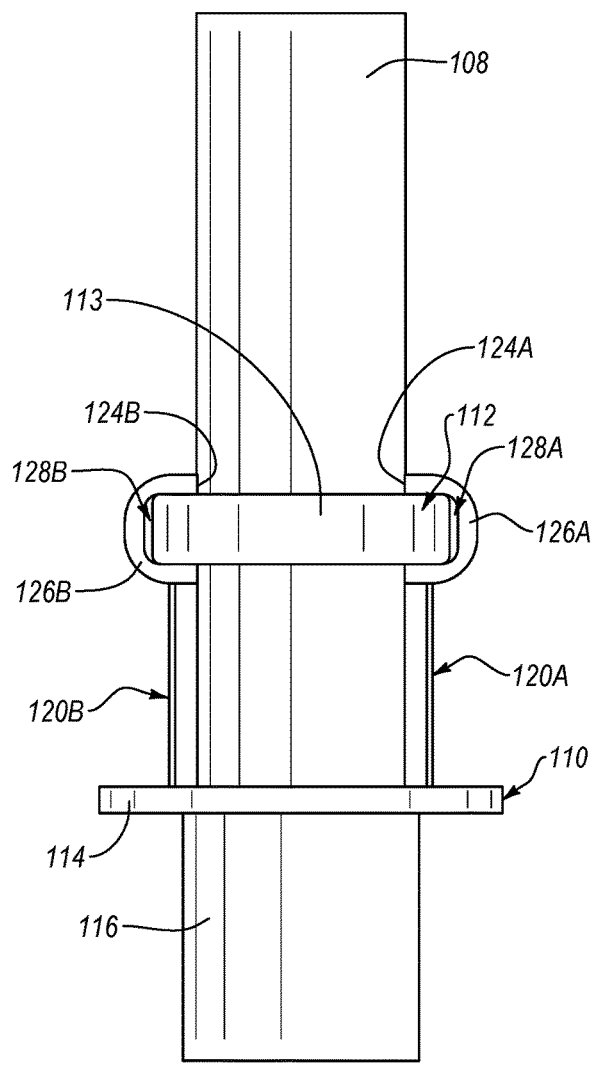
FIG. 12 is a schematic, top plan view of a tube connector and an endotracheal tube of the ventilator system of FIG. 1, according to one or more examples of the present disclosure.

In some examples, the outer surfaces of the circuit engagement portion 116 and the ETT engagement portion 118 are circular, such that the first width W1, the second width W2, and the width W3 can be diameters. Likewise, the outer periphery of the base 114 can be circular, such that the width W4 is a diameter. Alternatively, the outer periphery of the base 114 may be non-circular, such as an oval shape as shown in FIGS. 10 and 11, such that the width W4 is a maximum dimension of the outer periphery of the base 114.

Figure 8:
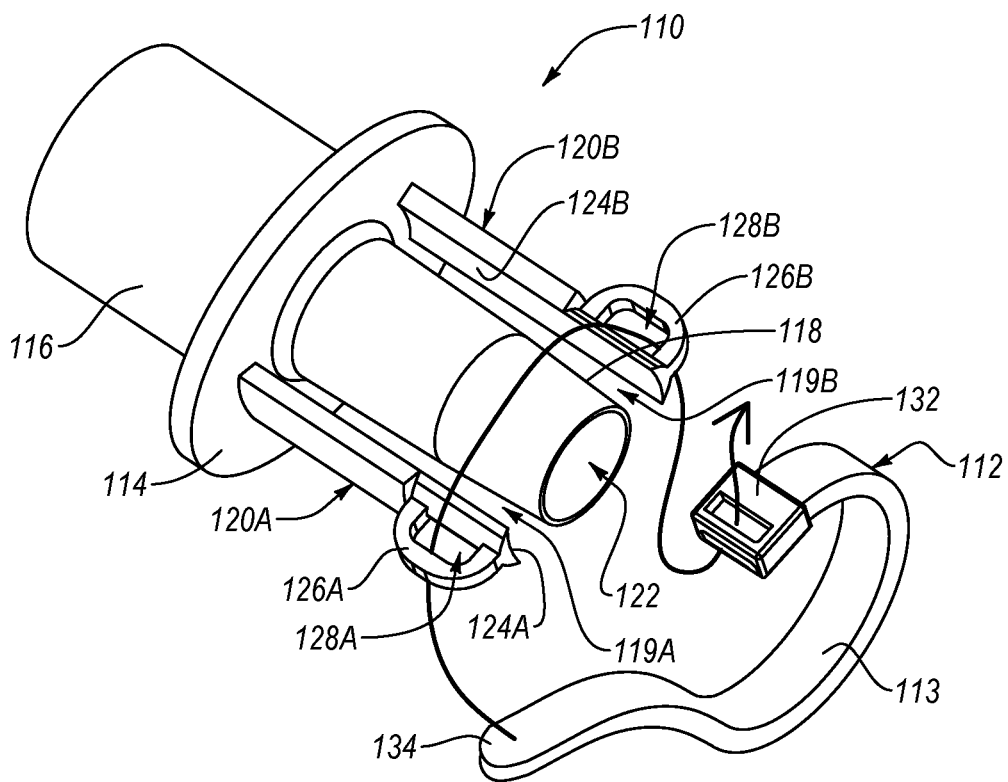
FIG. 8 is a schematic, perspective view of a tube connector of the ventilator system of FIG. 1, showing a tightening strap of the tube connector in an untightened condition, according to one or more examples of the present disclosure.
Figure 9:
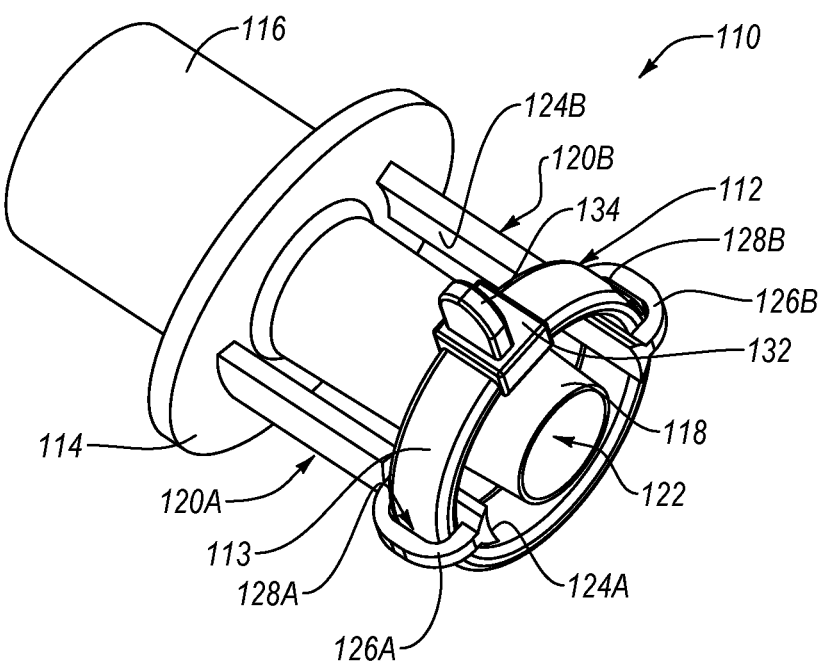
FIG. 9 is a schematic, perspective view of a tube connector of the ventilator system of FIG. 1, showing a tightening strap of the tube connector in a tightened condition, according to one or more examples of the present disclosure.

As shown in FIGS. 8 and 9, the tube connector 110 further includes a tightening strap 112. The tightening strap 112 is configured to form a secure taut loop about the first engagement arm 120A and the second engagement arm 120B. The tightening strap 112 includes an elongated strip of material 113, a self-locking mechanism 132 at one end of the strip of material 113, and a free end 134 at an opposite end of the strip of material 113. The free end 134 can be inserted and pulled through the self-locking mechanism 132 in one direction while movement in the opposite direction is prevented. Accordingly, in some examples, the self-locking mechanism 132 includes a ratchet and the free end 134 includes teeth (not shown) that engage the ratchet to prevent movement in one direction but not in the opposite direction. The tightening strap 112 is a cable tie, zip tie, hose tie, and the like, in certain examples.

As shown in FIG. 9, the tightening strap 112 is coupled to the first engagement arm 120A and the second engagement arm 120B by threading the free end through the first loophole 128A and the second loophole 128B. The free end is then inserted and pulled through the self-locking mechanism 132 until a desired tension is placed on the strip of material 113. The desired tension corresponds with a desired retention force applied to the ETT 108, as described in more detail below.

The circuit engagement portion 116, the base 114, the ETT engagement portion 118, the first engagement arm 120A, and the second engagement arm 120B form a one-piece monolithic construction in some examples. In one example, the circuit engagement portion 116, the base 114, the ETT engagement portion 118, the first engagement arm 120A, and the second engagement arm 120B are co-molded together and made from a plastic material. The tightening strap 112 is formed separately from the circuit engagement portion 116, the base 114, the ETT engagement portion 118, the first engagement arm 120A, and the second engagement arm 120B, in certain examples. However, in other examples, the tightening strap 112, the circuit engagement portion 116, the base 114, the ETT engagement portion 118, the first engagement arm 120A, and the second engagement arm 120 form a one-piece monolithic construction (e.g., the strip of material 113 is co-molded with one of the first and second engagement arms and passes through a loophole formed in the other of the first and second engagement arms before being tightened and locked by the self-locking mechanism (see, e.g., FIG. 13)).

The tube connector 110 mechanically and fluidically couples together the convergence tube 106 and the ETT 108 via an assembly process, according to one example shown with reference to FIGS. 10-13. The assembly process includes inserting the circuit engagement portion 116 of the tube connector 110 into the convergence tube 106 of the flow circuit 104. The circuit engagement portion 116 is fitted within an interior channel 131 of the convergence tube 106 with a friction fit. Similarly, the assembly process includes inserting the ETT engagement portion 118 into an interior channel 130 of the ETT 108 with a friction fit, which positions (e.g., seats) the ETT 108 within the first gap 119A and the second gap 119B. Because the ETT engagement portion 118 is tapered, only a portion of the ETT engagement portion 118 engages the ETT 108 with a friction fit. This friction fit provides some retention of the ETT 108 on the ETT engagement portion 118. However, as presented above, during operation of the ventilator system 100, the ETT 108 has a tendency to slip off of the ETT engagement portion 118.

To help retain the ETT 108 on the ETT engagement portion 118 during use of the ventilator system 100, and overcome the shortcomings of conventional systems, the assembly process further includes pressing the first engagement arm 120A and the second engagement arm 120B against the ETT 108 with the tightening strap 112. The tightening strap 112 is threaded through the first loophole 128A and the second loophole 128B before inserting the free end 134 into and through the self-locking mechanism 132 to form a loop with the strip of material 113. As shown in FIG. 11, the loop formed by the strip of material 113 encircles the ETT engagement portion 118 and the ETT 108, when the ETT 108 is engaged with the ETT engagement portion 118. Accordingly, the tightening strap 112 can be threaded through the first loophole 128A and the second loophole 128B, and formed into a loop around the ETT engagement portion 118, before or after the ETT 108 is engaged with the ETT engagement portion 118. With the tightening strap 112 formed into the loop and the ETT 108 engaged with the ETT engagement portion 118, as shown in FIG. 11, the tightening strap 112 can be tightened, by pulling the free end 134 further through the self-locking mechanism 132, which closes the loop (i.e., reduces a diameter of the loop) and urges the first engagement arm 120A and the second engagement arm 120B to flex radially inwardly toward the ETT 108.

Further tightening of the tightening strap 112 eventually results in the first engagement arm 120A and the second engagement arm 120B contacting and applying a radially inwardly directed pressure against the ETT 108, which acts to compress the ETT 108 between the first and second engagement arms and the ETT engagement portion 118, thus clamping the ETT 108 between the engagement arms and the ETT engagement portion 118. This compression of the ETT 108 against the ETT engagement portion 118 helps to retain the ETT 108 in place against the ETT engagement portion 118. The tightening strap 112 can be tightened to a desired tension, corresponding with a desired radially inwardly directed pressure against and compression of the ETT 108, which also corresponds with a desired retention of the ETT 108 to the tube connector 110. To promote retention, in some examples, the first tube engagement surface 124A and the second tube engagement surface 124B include friction-inducing features 150 (e.g., small protrusions or a friction-inducing surface treatment (high surface roughness)) (see, e.g., FIGS. 4 and 5).

Figure 14:
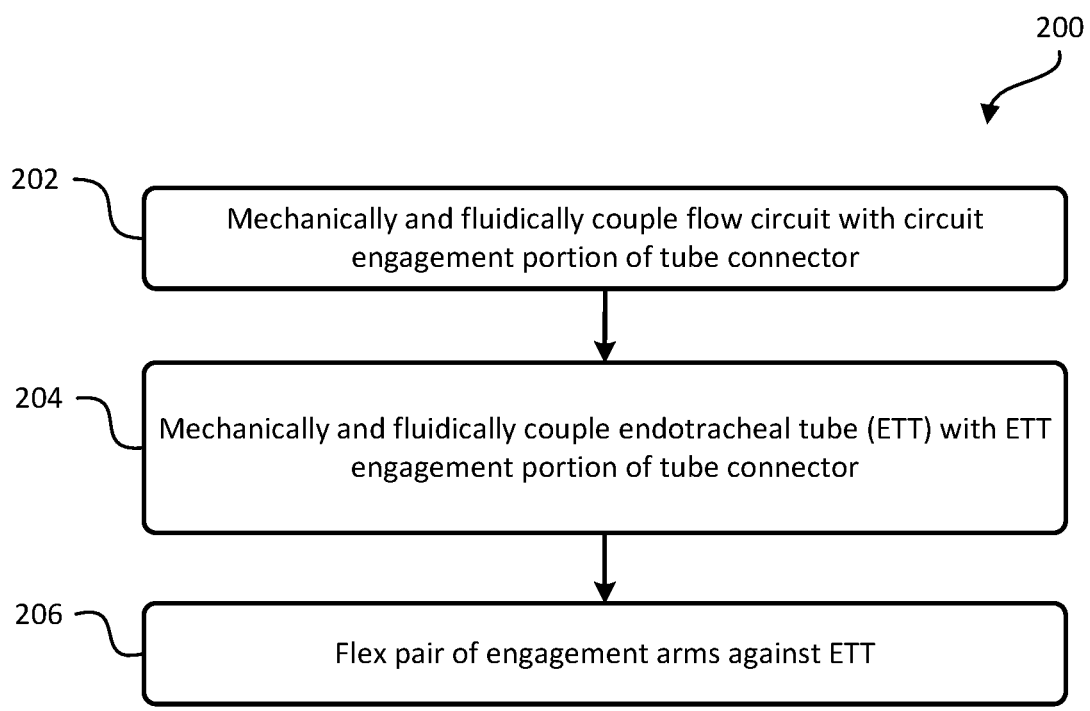
FIG. 14 is a schematic flow chart of a method of assembling a ventilator system, according to one or more examples of the present disclosure.

Referring to FIG. 14, according to another example, a method 200 of assembling the ventilator system 100 includes (block 202) mechanically and fluidically coupling the flow circuit 104 with the circuit engagement portion 116 of the tube connector 110. The method 200 also includes (block 204) mechanically and fluidically coupling the ETT 108 with the ETT engagement portion 118 of the tube connector 110 such that the ETT 108 is positioned between the ETT engagement portion 118 and the pair of engagement arms 120A-B of the tube connector 110. The method 200 further includes (block 206) flexing the pair of engagement arms 120A-B against the ETT 108 such that the ETT 108 is clamped between the pair of engagement arms 120A-B and the ETT engagement portion 118.

In addition to the first engagement arm 120A and the second engagement arm 120B applying an inwardly directed pressure against the ETT 108, the strip of material 113 of the tightening strap 112, being flexible and forming a loop around the ETT 108, also applies an inwardly directed pressure against the ETT 108 at locations laterally adjacent the first and second engagement arms. Accordingly, the configuration of the tightening strap 112, in some examples, provides additional inwardly directed pressure against, compression of, and retention of the ETT 108.

Although not shown, in some examples, the tube connector 110 includes more than two engagement arms, such as four engagement arms, extending from the base 114 in the outflow direction and the tightening strap 112 can be threaded through the additional engagement arms to urge them against the ETT 108.

Figure 13:
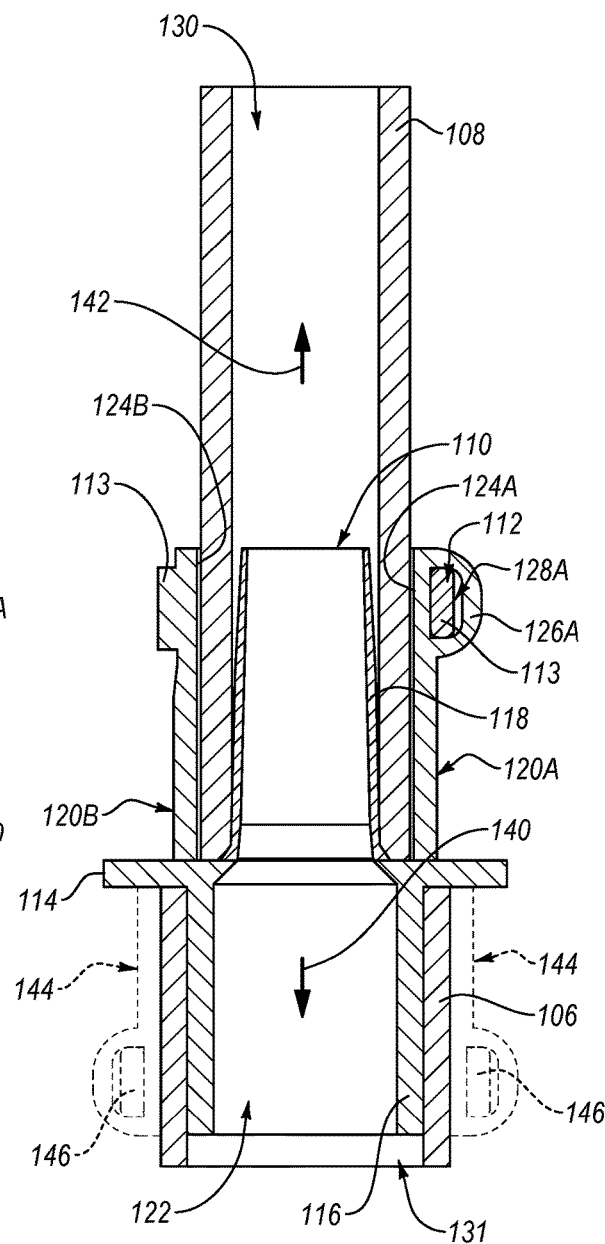
FIG. 13 is a schematic, cross-sectional, top plan view of a tube connector, an endotracheal tube, and a convergence tube of the ventilator system of FIG. 1, taken along the line 13-13 of FIG. 2, according to one or more examples of the present disclosure.

Optionally, in some examples, as shown in dashed lines in FIG. 13, the tube connector 110 can include at least two engagement arms 144 extending from the base 114 in the inflow direction, located on opposite sides of the circuit engagement portion 116, and spaced apart from the circuit engagement portion 116. These engagement arms can be configured in a manner similar to the first engagement arm 120A and the second engagement arm 120B and urged against the convergence tube 106 with a second tightening strip 146 to help keep the convergence tube 106 engaged with the circuit engagement portion 116.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A tube connector for mechanically and fluidically coupling together a flow circuit and an endotracheal tube (ETT) of a ventilator system, the tube connector comprising:
   a medial flange comprising a flat, plate-like structure;
   a circuit engagement portion, comprising a hollow cylindrical structure extending from the medial flange in an inflow direction and configured for frictional insertion into a convergence tube of the flow circuit;
   an ETT insertion portion, comprising a tapered hollow cylindrical structure extending from the medial flange in an outflow direction that is opposite the inflow direction and dimensioned to achieve a friction fit and self-alignment within the ETT;
   a first engagement arm, extending from the medial flange in the outflow direction, located on a first side of the ETT insertion portion, and spaced apart from the ETT insertion portion, such that a first gap is defined between the first engagement arm and the ETT insertion portion; and
   a second engagement arm, extending from the medial flange in the outflow direction, located on a second side of the ETT insertion portion, opposite the first side of the ETT insertion portion, and spaced apart from the ETT insertion portion, such that a second gap is defined between the second engagement arm and the ETT insertion portion;
   wherein:
      a maximum dimension of the medial flange, on a plane perpendicular to the inflow direction, is greater than a maximum distance, along the plane, between an outer peripheral extent of the first engagement arm and an outer peripheral extent of the second engagement arm; and
      each one of the first engagement arm and the second engagement arm is cantilevered, flexible, and configured to exert a radially inwardly directed pressure on the ETT when flexed and when the ETT insertion portion is within the ETT.

2. The tube connector according to claim 1, further comprising a tightening strap, engageable with the first engagement arm and the second engagement arm and, when engaged with the first engagement arm and the second engagement arm, tightenable to urge the first engagement arm and the second engagement arm toward the ETT insertion portion such that the first gap and the second gap are narrowed.

3. The tube connector according to claim 2, wherein:
   the first engagement arm comprises a first loop;
   the second engagement arm comprises a second loop; and
   each one of the first loop and the second loop is configured to receive and retain the tightening strap.

4. The tube connector according to claim 2, wherein the tightening strap comprises:
   an elongated strip, comprising a free end; and
   a self-locking mechanism, configured to receive the free end in only a single pass.

5. The tube connector according to claim 1, wherein:
   the first engagement arm comprises a first tube engagement surface, facing the ETT insertion portion and having a first radius of curvature about a first axis that is parallel to the inflow direction;
   the second engagement arm comprises a second tube engagement surface, facing the ETT insertion portion and having a second radius of curvature about a second axis that is parallel to the inflow direction and that is equal to the first radius of curvature; and
   the first radius of curvature and the second radius of curvature correspond to an outer curvature of the ETT.

6. The tube connector according to claim 5, wherein each one of the first tube engagement surface and the second tube engagement surface comprises friction-inducing features.

7. The tube connector according to claim 5, wherein the first tube engagement surface, the second tube engagement surface, and the ETT insertion portion are concentric configured to evenly distribute the radially inwardly directed pressure on the ETT.

8. The tube connector according to claim 1, wherein:
   each one of the first engagement arm and the second engagement arm comprises a supported end at the medial flange and an unsupported end away from the medial flange; and
   the unsupported end of each one of the first engagement arm and the second engagement arm is movable, toward the ETT insertion portion under an applied force, relative to the supported end of the corresponding one of the first engagement arm and the second engagement arm.

9. The tube connector according to claim 8, wherein:
the first engagement arm comprises a first loop located at the unsupported end of the first engagement arm;
the second engagement arm comprises a second loop located at the unsupported end of the second engagement arm; and
each one of the first loop and the second loop is configured to receive a tightening strap.

10. The tube connector according to claim 1, wherein
at least a portion of an outer surface of the hollow cylindrical structure configured to fit within the ETT is tapered in the outflow direction.

11. The tube connector according to claim 1, wherein the medial flange, the circuit portion, the ETT insertion portion, the first engagement arm, and the second engagement arm form a one-piece, seamless, and monolithic construction.

12. The tube connector according to claim 1, wherein:
the tube connector further comprises an interior channel that passes entirely through the circuit portion, the medial flange, and the ETT insertion portion.

13. The tube connector according to claim 12, wherein a diameter of a portion of the interior channel defined by the ETT insertion portion is less than a diameter of a portion of the interior channel defined by the circuit engagement portion.

14. The tube connector according to claim 1, further comprising:
a third engagement arm, extending from the medial flange in the inflow direction, located on a first side of the circuit engagement portion, and spaced apart from the circuit engagement portion, such that a third gap is defined between the third engagement arm and the circuit engagement portion; and
a fourth engagement arm, extending from the medial flange in the inflow direction, located on a second side of the circuit engagement portion that is opposite the first side of the circuit engagement portion, and spaced apart from the circuit engagement portion, such that a fourth gap is defined between the fourth engagement arm and the circuit engagement portion.

15. The tube connector according to claim 1, wherein each one of the first engagement arm and the second engagement arm surrounds no more than 15% of a circumference of the ETT insertion portion.

16. A ventilator system, comprising:
a ventilator, operable to alternately generate an oxygen-rich air flow and receive an oxygen-depleted air flow;
a flow circuit, fluidically coupled with the ventilator to receive the oxygen-rich air flow from the ventilator and to provide the oxygen-depleted air flow to the ventilator;
a tube connector, fluidically coupled with the flow circuit to receive the oxygen-rich air flow from the flow circuit and to provide the oxygen-depleted air flow to the flow circuit; and
an endotracheal tube (ETT), fluidically coupled with the tube connector to receive the oxygen-rich air flow from the tube connector and to provide the oxygen-depleted air flow to the tube connector,
wherein the tube connector comprises:
a medial flange comprising a flat, plate-like structure;
a circuit engagement portion, extending from the medial flange, mechanically engaged with the flow circuit, and comprising a hollow cylindrical structure that is frictionally inserted into a convergence tube of the flow circuit;
an ETT insertion portion, extending from the medial flange in a direction opposite that of the circuit engagement portion, mechanically engaged with the ETT via a friction-fit, and comprising a tapered hollow cylindrical structure;
a first engagement arm and a second engagement arm spaced apart from the ETT insertion portion, on opposite sides of the ETT insertion portion, such that respective gaps are defined between the first engagement arm and the ETT portion, and between the second engagement arm and the ETT insertion portion, wherein the ETT is positioned within the gaps; and
a tightening strap, engaged with the first engagement arm and second engagement arms to urge the first engagement arm and the second engagement arm against the ETT such that the ETT is clamped between the first engagement arm and the ETT insertion portion and between the second engagement arm and the ETT insertion portion;
wherein:
a maximum dimension of the medial flange, on a plane perpendicular to a direction of air flow through the tube connector, is greater than a maximum distance, along the plane, between an outer peripheral extent of the first engagement arm and an outer peripheral extent of the second engagement arm; and
each one of the first engagement arm and the second engagement arm is cantilevered, flexible, and configured to exert a radially inwardly directed pressure on the ETT when flexed and when the ETT insertion portion is within the ETT.

17. The ventilator system according to claim 16, wherein:
the first engagement arm comprises a first tube engagement surface, facing the ETT insertion portion and having a first radius of curvature;
the second engagement arm comprises a second tube engagement surface, facing the ETT insertion portion and having a second radius of curvature; and
the first radius of curvature and the second radius of curvature are equal to a radius of curvature of an exterior surface of the ETT.

18. The ventilator system according to claim 16, wherein:
a size of the gaps, along at least a portion of the gaps, is greater than a thickness of the ETT when the tightening strap is not engaged with the first engagement arm and the second engagement arm; and
the size of the gaps, along at least a portion of the gaps, is equal to the thickness of the ETT when the tightening strap is engaged with the first engagement arm and the second engagement arm.

19. A method of assembling a ventilator system, the method comprising steps of:
mechanically and fluidically coupling a flow circuit with a circuit engagement portion of a tube connector;
mechanically and fluidically coupling an endotracheal tube (ETT) with an ETT insertion portion of the tube connector such that a tapered hollow cylindrical structure of the ETT insertion portion is secured within the ETT via a friction fit, and such that the ETT is positioned between the ETT insertion portion and a pair of engagement arms of the tube connector, wherein the pair of engagement arms are spaced apart from the ETT insertion portion on opposite sides of the ETT insertion portion; and flexing the pair of engagement arms against the ETT via a tightening strap engaged with the pair of engagement arms such that the ETT is clamped between the pair of engagement arms and the ETT insertion portion;

wherein:
- the tube connector comprises a medial flange comprising a flat, plate-like structure;
- the ETT insertion portion and the pair of engagement arms extend from the medial flange in the same direction;
- a maximum dimension of the medial flange, on a plane perpendicular to a direction of air flow through the tube connector, is greater than a maximum distance, along the plane, between outer peripheral extents of the pair of engagement arms; and
- each engagement arm of the pair of engagement arms is cantilevered, flexible, and configured to exert a radially inwardly directed pressure on the ETT when flexed and when the ETT insertion portion is within the ETT.

\* \* \* \* \*